US009060260B2

(12) United States Patent
Dunko

(10) Patent No.: US 9,060,260 B2
(45) Date of Patent: Jun. 16, 2015

(54) METHOD AND APPARATUS FOR TAILORING ELECTRONIC CONTENT RETRIEVAL ACCORDING TO WIRELESS COMMUNICATION DEVICE CAPABILITIES

(75) Inventor: Gregory A Dunko, Cary, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2136 days.

(21) Appl. No.: 11/258,472

(22) Filed: Oct. 25, 2005

(65) Prior Publication Data

US 2007/0207794 A1    Sep. 6, 2007

(51) Int. Cl.
*H04M 3/00* (2006.01)
*H04W 8/22* (2009.01)
*H04W 48/18* (2009.01)
*H04W 48/20* (2009.01)

(52) U.S. Cl.
CPC ............... *H04W 8/22* (2013.01); *H04W 48/18* (2013.01); *H04W 48/20* (2013.01)

(58) Field of Classification Search
CPC ....................................................... H04W 8/22
USPC ......................................................... 455/419
See application file for complete search history.

(56) References Cited

U.S. PATENT DOCUMENTS

| | | | | |
|---|---|---|---|---|
| 5,754,227 | A * | 5/1998 | Fukuoka | 348/231.6 |
| 6,493,758 | B1 * | 12/2002 | McLain | 709/227 |
| 6,714,794 | B1 * | 3/2004 | O'Carroll | 455/466 |
| 6,801,793 | B1 * | 10/2004 | Aarnio et al. | 455/566 |
| 7,167,703 | B2 * | 1/2007 | Graham et al. | 455/415 |
| 7,805,453 | B2 * | 9/2010 | Ostrover | 707/758 |
| 2002/0138545 | A1 * | 9/2002 | Andreakis et al. | 709/200 |
| 2004/0024867 | A1 * | 2/2004 | Kjellberg | 709/224 |
| 2004/0043763 | A1 * | 3/2004 | Minear et al. | 455/419 |
| 2004/0133686 | A1 * | 7/2004 | Skog et al. | 709/228 |
| 2004/0193704 | A1 * | 9/2004 | Smith | 709/220 |
| 2004/0198360 | A1 * | 10/2004 | Kotzin | 455/445 |
| 2004/0203648 | A1 * | 10/2004 | Wong | 455/414.1 |

(Continued)

FOREIGN PATENT DOCUMENTS

| | | |
|---|---|---|
| EP | 0948225 A1 | 10/1999 |
| GB | 2362293 | 11/2001 |

(Continued)

OTHER PUBLICATIONS

Uyar et al., "Reliable Server Pooling for Future Combat Systems," 2003 IEEE Military Communications Conference, Oct. 13-16, 2003, pp. 927-932, vol. 2, New York, NY, XP10698611.

(Continued)

*Primary Examiner* — Charles Shedrick
(74) *Attorney, Agent, or Firm* — Coats & Bennett, PLLC

(57) ABSTRACT

A wireless communication device, such as a cellular handset, is configured to tailor its retrieval of electronic content, such as through a web feed, according to one or more capability parameters of the device. In one embodiment, a wireless communication device is configured, such as by including appropriate computer program instructions, to tailor its retrieval of electronic content based on maintaining device capability information in the wireless communication device, and filtering one or more electronic feeds received by the wireless communication device to identify electronic content having content characteristics commensurate with the device capability information.

22 Claims, 2 Drawing Sheets

(56) References Cited

U.S. PATENT DOCUMENTS

| | | | |
|---|---|---|---|
| 2005/0039135 A1* | 2/2005 | Othmer et al. | 715/774 |
| 2005/0198525 A1* | 9/2005 | Trossen et al. | 713/200 |
| 2006/0077941 A1* | 4/2006 | Alagappan et al. | 370/338 |
| 2006/0129638 A1* | 6/2006 | Deakin | 709/203 |
| 2006/0159109 A1* | 7/2006 | Lamkin et al. | 370/401 |
| 2006/0217126 A1* | 9/2006 | Sohm et al. | 455/454 |
| 2006/0218294 A1* | 9/2006 | Rosenberg | 709/231 |
| 2006/0259462 A1* | 11/2006 | Timmons | 707/3 |
| 2006/0265489 A1* | 11/2006 | Moore | 709/223 |
| 2007/0050446 A1* | 3/2007 | Moore | 709/203 |
| 2007/0050458 A1* | 3/2007 | Rotzoll et al. | 709/206 |
| 2007/0077921 A1* | 4/2007 | Hayashi et al. | 455/414.1 |
| 2007/0150592 A1* | 6/2007 | Bell | 709/226 |
| 2008/0126476 A1* | 5/2008 | Nicholas et al. | 709/203 |
| 2010/0017724 A1* | 1/2010 | Wang et al. | 715/744 |

FOREIGN PATENT DOCUMENTS

| | | |
|---|---|---|
| JP | 2001218270 A | 8/2001 |
| JP | 2001282677 A | 10/2001 |
| JP | 2001359050 A | 12/2001 |
| JP | 2004165836 A | 6/2004 |
| JP | 2004355524 A | 12/2004 |
| JP | 2005158157 A | 6/2005 |
| JP | 2005295332 A | 10/2005 |
| WO | 2005026985 A2 | 3/2005 |

OTHER PUBLICATIONS

Pils et al., "The Performance Server: Rational Server Selection for Mobile Agents," Computers and Communications, Jun. 28, 2004, pp. 13-18, vol. 1, Piscataway, NJ, XP010741889.

PCT International Search Report, International Application No. PCT/US2006/030601, Date of Mailing: Dec. 12, 2006.

Nilsson, Mikael et. al. "Composite Capabilities/Preference Profiles: Requirements and Architecture". Jul. 2000. 48 pages. W3C. URL: http://www.w3.orq/TR/CCPP-ra/.

Kitagawa, Kazuhiro et. al. "Mobile Access". Jul. 3, 2001. 6 pages. W3C. URL: http://www.w3.orq/Mobile/Activity.

Klyne, Graham et. al. "Composite Capability/Preference Profiles (CC/PP): Structure and Vocabularies 1.0". Jan. 15, 2004. 70 pages. W3C. URL: http://www.w3.org/TR/CCPP-struct-vocab/.

Kamada, Tomihisa et. al. HTML 4.0 Guidelines for Mobile Access. Mar. 15, 1999. 30 pages. W3C. URL: http://www.w3.org/TR/NOTE-html40-mobile/.

Baker, Mark et. al. "XHTML Basic". Dec. 19, 2000. 14 pages. W3C. URL: http://www.w3.org/TR/xhtml-basic/.

EP Communication 94(3) issued Sep. 18, 2012 in re EP Application No. 06789473.3.

* cited by examiner

METHOD AND APPARATUS FOR TAILORING ELECTRONIC CONTENT RETRIEVAL ACCORDING TO WIRELESS COMMUNICATION DEVICE CAPABILITIES

BACKGROUND

The present invention relates to wireless communication devices, such as cellular handsets, and particularly relates to tailoring electronic content retrieval, such as content from a web feed, to the capabilities of such devices.

Web feeds represent an increasingly popular means for providing electronic content. As one example, establishing a web feed is accomplished by placing an extensible Markup Language (XML) document on a network-accessible computer, e.g., a web server. More particularly, the XML document includes an item list with embedded electronic content, or with links to such content. Feed subscribers watch or otherwise monitor the file for item list changes, so that new content can be accessed when it becomes available.

Various mechanisms exist for subscribing to web feeds. As one example, a personal computer (PC) may be configured with aggregator software. Aggregators monitor selected web feeds and provide their users with updated content listings, and can be configured to automatically retrieve updated content from selected feeds. Aggregators that target specific types of feeds generally have specialized names. For example, aggregators targeting news feeds (e.g., RSS-based news feeds) are often referred to as news readers, while aggregators targeting "podcast" feeds are often referred to as "podcatchers."

Podcast feeds typically comprise item lists that include or link to audio files, e.g., MP3 files, but the term does not exclude other content type, such as images, video, etc. Podcasting perhaps finds its greatest use by both professionals and amateurs in publishing serial audio content to the web. For example, well known radio (or online) talk and special interest programs oftentimes are made available as downloadable audio or video files through web feeds that are updated as new content is posted. So called "bloggers" also frequently post new content, which may be downloaded by interested users through the corresponding web feeds.

Podcatching and other content retrieval operations become more challenging in the mobile environment. For example, depending on the nature and current operating conditions of the retrieving (mobile) device, its capabilities may be quite limited or relatively expansive. Some limitations may be inherent, such as screen size and resolution, color depth, audio quality, audio/video codec support, processing capability (e.g., frames per second), supportable file types and sizes, maximum connection speed, etc. Other limitations may be transient in nature, such as available memory capacity of the retrieving device and the variability of achievable data rates as a function of changing radio access network types and/or changing radio conditions.

SUMMARY

A wireless communication device, such as a cellular handset, is configured to tailor its retrieval of electronic content, such as through a web feed, according to one or more capability parameters of the device. In one embodiment, a wireless communication device is configured, such as by including appropriate computer program instructions, to tailor its retrieval of electronic content based on maintaining device capability information in the wireless communication device, and filtering one or more electronic feeds received by the wireless communication device to identify electronic content having content characteristics commensurate with the device capability information.

In at least one embodiment, at least a portion of the device capability information is dynamic. Thus, maintaining device capability information may comprise, for example, maintaining dynamic device capability information as a function of changing memory capacity, changing user interface capability, changing connection data rates available to the wireless communication device, and/or changing radio access network types available to the wireless communication device.

In these, or in other embodiments, at least a portion of the device capability information is static. Thus, maintaining device capability information may comprise, for example, maintaining static device capability information in a memory of the wireless communication device bearing on at least one of device display characteristics, device user interface characteristics, device audio characteristics, device memory characteristics, content type compatibility characteristics, and device processor characteristics.

As such, the wireless communication device may be configured to filter the electronic feed(s) received by the wireless communication device by, for example, receiving content information from or for the one or more electronic feeds that identifies available electronic content and corresponding content characteristics, and evaluating the content characteristics with respect to the device capability information to identify electronic content having commensurate content characteristics.

In a non-limiting example of a suitably configured wireless communication device, the wireless communication device includes a computer readable medium storing a computer program configured to tailor electronic content retrieval by a wireless communication device. The computer program includes program instructions to maintain device capability information in the wireless communication device, and program instructions to filter one or more electronic feeds received by the wireless communication device to identify electronic content having content characteristics commensurate with the device capability information. One or more processing circuits included in the wireless communication device may be adapted to execute the computer program.

Of course, the present invention is not limited to the above features and advantages. Indeed, those skilled in the art will recognize additional features and advantages upon reading the following detailed discussion, and upon viewing the accompanying drawings.

DETAILED DESCRIPTION

Figure 1:
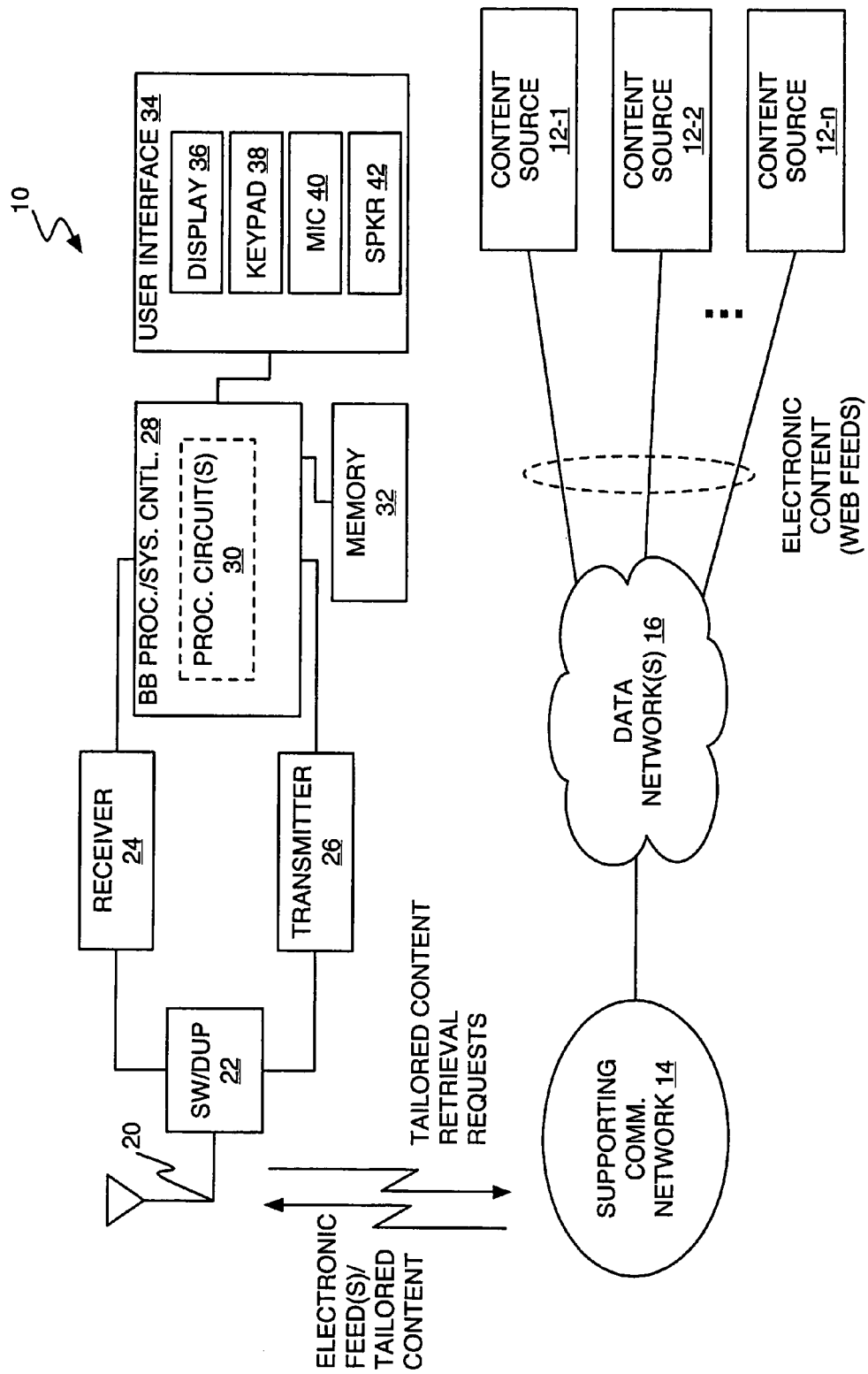
FIG. 1 is a block diagram of a wireless communication device configured to tailor its retrieval of electronic content through a supporting wireless communication network according to device capability information.

FIG. 1 illustrates a wireless communication device 10 that is communicatively coupled to one or more (electronic) content sources 12 directly or indirectly through a supporting wireless communication network 14. For example, in the illustration, the supporting network 14 is coupled to one or more public and/or private data networks 16, such as the Internet, which provide access to the content sources 12. However, it should be understood that that the content sources 12 may be available directly within or through the supporting network 14.

In any case, the device 10 is configured to maintain device capability information, and filter one or more electronic feeds received by it to identify electronic content having content characteristics commensurate with the device capability information. As an example, the electronic feed(s) available from the content sources 12 may comprise podcasts and/or other types of web feeds, and the device 10 may identify electronic content available through such feeds that complement its capabilities. Thus, the device 10 may retrieve video or multimedia files that complement its display capabilities, its memory/processor capabilities, its encoding/file type compatibilities, its data connection rates, etc.

Returning to the details of FIG. 1, in the illustrated embodiment, the device 10 comprises a receive/transmit antenna 20, a switch/duplexer 22, a receiver circuit 24, a transmitter circuit 26, baseband processing/system control circuits 28, which include one or more processing circuits 30 configured to support tailored content retrieval as taught herein, memory circuit(s) 32, and a user interface 34. In at least one embodiment, the user interface 34 includes a display 36, a keypad 38, a microphone 40, and a speaker 42 (or other audio output device or system).

By way of non-limiting example, the device 10 comprises a cellular handset, such as a GSM (Global System for Mobile communications) /GPRS (General Packet Radio Service) or Wideband CDMA (Wideband Code Division Multiple Access) handset and, in turn, the supporting communication network 14 comprises a cellular network, including radio access and core network entities as needed to support wireless communication with the device 10, and backend communication with the data network(s) 16.

Of course, it should be understood that the device 10 can be configured as a wireless pager, PDA, palmtop/laptop computer, or other type of portable communication device. The intended use and the desired features will dictate the particular implementation of the device 10, and it should be understood that the particulars of supporting communication network 14 will change according to the particular implementation of the device 10. For example, one or more of the illustrated user interface elements may be omitted from the device 10, as needed or desired, and other user interface elements, e.g., haptic and/or biometric elements, may be substituted or added to the device 10. In a further example, the supporting communication network 14 may comprise a short-range radio network, such as WiFi or Bluetooth, or may comprise a wider area radio network, such as WiMax, and that the communication circuits (receiver 24 and transmitter 26) of the device 10 will be configured as needed to support the particular air interface(s) desired in a given implementation.

Regardless, the one or more processing circuits 30 of the device 10 are configured to receive electronic feeds, and to tailor its retrieval of electronic content associated with those feeds according to device capability information. As such, the processing circuit(s) 30 may comprise one or more microprocessors, digital signal processors, application specific integrated circuits, field programmable gate arrays, and/or other types of digital processing circuits, configured according to computer program instructions implemented in software (or firmware). Such circuits may be shared with other signal and control functions of the baseband processor/system control circuits 28.

Figure 3:
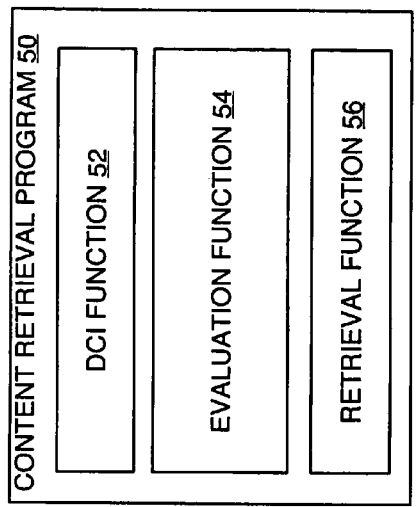
FIG. 3 is a block diagram of a computer program functional arrangement for an embodiment of tailored content retrieval.
Figure 2:
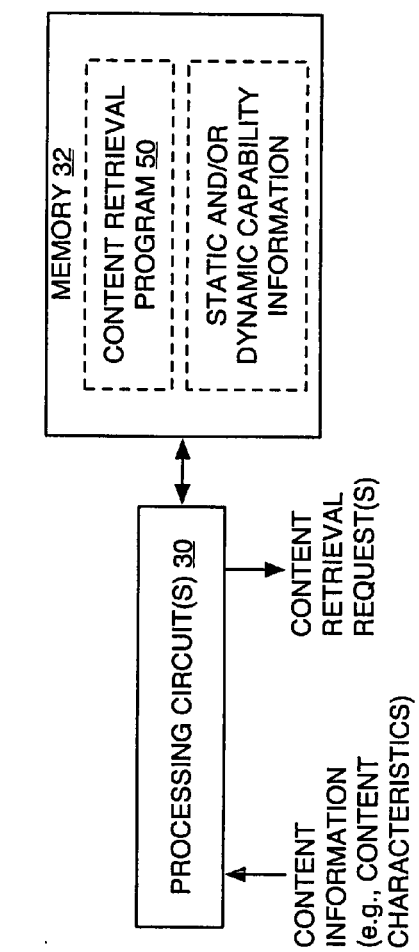
FIG. 2 is a block diagram of one or more processing circuits and associated memory, which may be configured for tailored content retrieval.

FIG. 2 illustrates one embodiment of the processing circuit(s) 30, wherein they are configured to support tailored electronic content retrieval as taught herein via a content retrieval program 50 that is stored in the memory circuit(s) 32, along with device capability information, which can be static or dynamic. FIG. 3 illustrates one functional embodiment of the content retrieval program 50, comprising program instructions implementing a device capability information (DCI) function 52, an evaluation function 54, and a retrieval function 56.

It should be understood that these illustrated program functions may perform other aspects of electronic content retrieval, and that the content retrieval program 50 may comprise a full-featured application suited for execution by the device 10. For example, the content retrieval program 50 may be a podcatching application or other type of browsing and/or retrieval program adapted for retrieving electronic content from the web, or from other data sources. Additionally, or alternatively, the content retrieval program 50 may be configured to control or otherwise communicate with the user interface 34 to provide output information corresponding to retrieved electronic content.

Figure 4:
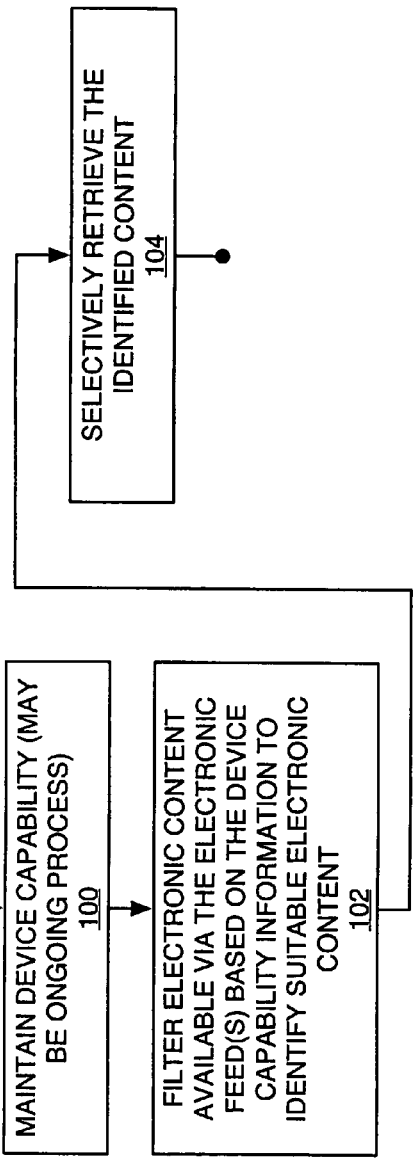
FIG. 4 is a process flow diagram for one embodiment of processing logic for carrying out tailored content retrieval.

Regardless of any additional features that may be provided or supported by the content retrieval program 50, FIG. 4 illustrates one embodiment of program flow logic to support tailored content retrieval. Processing "begins" with maintaining device capability information (Step 100).

Static (unchanging) device capability information may relate to the hardware and/or software configuration of the device 10, and maintaining such information simply comprises storing or otherwise holding such information in the memory circuit 32, for example. As a non-limiting example, holding static device capability information in the memory 32 may comprise storing information bearing on at least one of device display characteristics, device user interface characteristics, device audio characteristics, device memory characteristics, content type compatibility characteristics, and device processor characteristics. Video screen type, resolution, and color depth represent common capability parameters of interest, as do memory capacities, codec compatibilities, and so on.

Dynamic device capability information is subject to change, and maintaining such information may comprise monitoring relevant conditions, and updating the device capability information accordingly. Unlike static device capability information, which may be stored in the device 10 as part of the manufacturing process, for example, maintaining dynamic device capability information represents an ongoing process step that may be performed in the background, or in parallel with other operations.

As an example, dynamic device capability information may be maintained as a function of changing connection data rates available to the device 10 and/or changing radio access network types available to the device 10. Such changing availabilities may arise, for example, as the device 10 changes from one operating mode to another, or moves from one location to another. In one embodiment, the device 10 comprises a dual-mode cellular handset capable of UMTS (Universal Mobile Telecommunications System) operation and capable of GPRS operation, with different (maximum) data rates available in the different modes.

As another example, dynamic device capability information may be maintained as a function of changing memory capacity of the device 10 and/or changing user interface capability of the device 10. Memory capacity may change, for example, as information is added to or removed from the memory 32 of the device 10 and/or upon upgrade to the memory storage capacity of the device 10. User interface capability may change, for example, as user interface elements are added to or removed from the device 10 to alter the processing capability of the device 10. The device 10 can detect the addition or removal of a user interface element and update its device capability information accordingly. In a non-limiting illustration, a QVGA (Quarter Video Graphics Array) display and/or media player accessory can be temporarily attached to the device 10 to improve the multimedia processing capability of the device.

Returning to the process flow, and assuming the receipt of one or more electronic feed(s) by the device 10, processing continues with "filtering" the electronic content available through such feeds based on the device capability information to identify suitable electronic content (Step 102). Such filtering may comprise receiving content information from or for the one or more electronic feeds that identifies available electronic content and corresponding content characteristics, and evaluating the content characteristics with respect to the device capability information to identify electronic content having commensurate content characteristics. That is, the electronic feeds may comprise XML or other data files that include item lists identifying the electronic content available from the feed. Such item lists may include content information in the form of meta tags, for example, that identify content characteristics for the listed items. The content characteristics can include file sizes, media types, video resolution, etc., as appropriate for the particular type of electronic content at issue.

As such, in at least one embodiment, evaluating the content characteristics with respect to the device capability information comprises at least one of identifying electronic content having file sizes commensurate with connection data rates available to the wireless communication device, identifying electronic content having file sizes commensurate with storage capacities of the wireless communication device, and identifying electronic content having content encoding or file types compatible with the wireless communication device. Of course, other characteristics may be evaluated additionally or alternatively to those just identified.

With such filtering, processing may continue with the selective retrieval of identified content (Step 104). For example, a user of the device 10 selective retrieval of identified content may comprise automatically retrieving identified electronic content associated with any electronic feeds to which the device 10 has an active subscription. Additionally, or alternatively, the selective retrieval of identified electronic content for processing by the device 10 may comprise retrieving identified electronic content responsive to user input indicating that such retrieval is desired.

With the above embodiments in mind, it should be understood that tailored content retrieval as taught herein provides for a wireless communication device, e.g., the device 10, that is configured to retrieve electronic content having content characteristics that are commensurate with its capabilities. In other words, the device 10 filters electronic feeds, so that unsuitable content is not retrieved, and does so without relying on the content sources 12, or intervening/supporting network entities being specially configured to support tailored content retrieval.

Of course, it further should be understood that the present invention is not limited by the foregoing description or by the accompanying drawings. Indeed, the present invention is limited only by the following claims and their legal equivalents.

What is claimed is:

1. A method of tailoring electronic content retrieval by a wireless communication device comprising:
   updating dynamic device capability information in the wireless communication device as a function of at least one of a changing location of the wireless communication device, a changing operating mode for the wireless communication device, and a changing user interface capability available to the wireless communication device;
   filtering one or more electronic feeds received by the wireless communication device by receiving content information at the wireless communication device from or for the one or more electronic feeds, the content information identifying available electronic content and corresponding characteristics, and evaluating the content characteristics at the wireless communication device with respect to the dynamic device capability information to identify electronic content at the wireless communication device having content characteristics commensurate with the dynamic device capability information; and
   selectively retrieving the electronic content that has been identified as having content characteristics commensurate with the dynamic device capability information from the electronic feeds to which the device is actively subscribed.

2. The method of claim 1, wherein updating the dynamic device capability information comprises updating the dynamic device capability information as a function of changing connection data rates available to the wireless communication device.

3. The method of claim 1, wherein updating the dynamic device capability information comprises updating the dynamic device capability information as a function of changing radio access network types available to the wireless communication device.

4. The method of claim 1, wherein updating the dynamic device capability information comprises updating the dynamic device capability information as a function of changing memory capacity available to the wireless communication device.

5. The method of claim 1, further comprising maintaining static device capability information in a memory of the wireless communication device bearing on at least one of device display characteristics, device user interface characteristics, device audio characteristics, device memory characteristics, content type compatibility characteristics, and device processor characteristics.

6. The method of claim 5, wherein updating the dynamic device capability information additionally comprises updating the dynamic device capability information as a function of at least one of changing connection data rates available to the wireless communication device, changing radio access network types available to the wireless communication device, and changing memory capacity available to the wireless communication device.

7. The method of claim 1, wherein evaluating the content characteristics at the wireless communication device with respect to the dynamic device capability information comprises at least one of identifying electronic content at the wireless communication device having file sizes commensurate with connection data rates available to the wireless communication device, identifying electronic content at the wireless communication device having file sizes commensurate with storage capacities of the wireless communication device, and identifying electronic content at the wireless communication device having content encoding or file types compatible with the wireless communication device.

8. The method of claim 1, further comprising selectively retrieving the identified electronic content at the wireless communication device for processing by the wireless communication device.

9. The method of claim 8, wherein selectively retrieving the identified content at the wireless communication device comprises automatically retrieving identified electronic content associated with any electronic feeds to which the wireless communication device has an active subscription.

10. The method of claim 8, wherein selectively retrieving the identified electronic content at the wireless communication device for processing by the wireless communication device comprises retrieving identified electronic content responsive to user input indicating that such retrieval is desired.

11. A wireless communication device comprising one or more processing circuits configured to:
update dynamic device capability information as a function of at least one of a changing location of the wireless communication device, a changing operating mode for the wireless communication device, and a changing user interface capability available to the wireless communication device;
filter one or more electronic feeds received by the wireless communication device by receiving content information from or for the one or more electronic feeds, the content information identifying available electronic content and corresponding characteristics, and evaluating the content characteristics with respect to the dynamic device capability information to identify electronic content having content characteristics commensurate with the dynamic device capability information; and
selectively retrieve the electronic content that has been identified as having content characteristics commensurate with the dynamic device capability information from the electronic feeds to which the device is actively subscribed.

12. The wireless communication device of claim 11, wherein the one or more processing circuits are configured to update the dynamic device capability information with information corresponding to changing connection data rates available to the wireless communication device.

13. The wireless communication device of claim 11, wherein the one or more processing circuits are configured to update the dynamic device capability information with information corresponding to changing radio access network types available to the wireless communication device.

14. The wireless communication device of claim 11, wherein the one or more processing circuits are configured to update the dynamic device capability information with information corresponding to changing memory capacity available to the wireless communication device.

15. The wireless communication device of claim 11, wherein the one or more processing circuits are configured to maintain static device capability information in a memory of the wireless communication device bearing on at least one of device display characteristics, device user interface characteristics, device audio characteristics, device memory characteristics, content type compatibility characteristics, and device processor characteristics.

16. The wireless communication device of claim 15, wherein the one or more processing circuits are configured to update the dynamic device capability information as a function of at least one of changing connection data rates available to the wireless communication device, changing radio access network types available to the wireless communication device, and changing memory capacity available to the wireless communication device.

17. The wireless communication device of claim 11, wherein evaluating the content characteristics with respect to the dynamic device capability information comprises at least one of identifying electronic content having file sizes commensurate with connection data rates available to the wireless communication device, identifying electronic content having file sizes commensurate with storage capacities of the wireless communication device, and identifying electronic content having content encoding or file types compatible with the wireless communication device.

18. The wireless communication device of claim 11, further comprising selectively retrieving the identified electronic content for processing by the wireless communication device.

19. The wireless communication device of claim 18, wherein selectively retrieving the identified content comprises automatically retrieving identified electronic content associated with any electronic feeds to which the wireless communication device has an active subscription.

20. The wireless communication device of claim 18, wherein selectively retrieving the identified electronic content for processing by the wireless communication device comprises retrieving identified electronic content responsive to user input indicating that such retrieval is desired.

21. In a wireless communication device, a computer readable medium storing a computer program configured to tailor electronic content retrieval by a wireless communication device, said computer program comprising program instructions that, when executed by the wireless communication device, configures the wireless communication device to:
update dynamic device capability information in the wireless communication device as a function of at least one of a changing location of the wireless communication device, a changing operating mode for the wireless communication device, and a changing user interface capability available to the wireless communication device;
filter one or more electronic feeds received by the wireless communication device by receiving content information from or for the one or more electronic feeds, the content information identifying available electronic content and corresponding characteristics, and evaluating the content characteristics with respect to the dynamic device capability information to identify electronic content having content characteristics commensurate with the dynamic device capability information; and
selectively retrieve the electronic content that has been identified as having content characteristics commensurate with the dynamic device capability information from the electronic feeds to which the device is actively subscribed.

22. The computer readable medium of claim 21, wherein the computer program comprises an electronic content retrieval program that, when executed by the wireless communication device, configures the wireless communication device to retrieve electronic content and to provide corresponding output information to a user of the wireless communication device via a user interface of the wireless communication device.

* * * * *